United States Patent [19]

Stahl et al.

[11] Patent Number: 4,630,943
[45] Date of Patent: Dec. 23, 1986

[54] FERROFLUID BEARING AND SEAL APPARATUS

[75] Inventors: Philip Stahl, Holliston, Mass.; Donald F. Wilcock, Schenectady; Dudley D. Fuller, Lake Hill, both of N.Y.

[73] Assignee: Ferrofluidics Corporation, Nashua, N.H.

[21] Appl. No.: 833,841

[22] Filed: Feb. 26, 1986

Related U.S. Application Data

[63] Continuation of Ser. No. 545,875, Oct. 27, 1983, abandoned.

[51] Int. Cl.[4] .................. F16C 33/74; F16C 33/82; F16J 15/40
[52] U.S. Cl. ........................... 384/133; 277/80; 277/135; 384/424; 384/446
[58] Field of Search ............. 384/133, 381, 397, 368, 384/424, 446, 425; 277/80, 135; 308/10

[56] References Cited

U.S. PATENT DOCUMENTS

| 3,439,961 | 4/1969 | Stiles | 384/114 |
| 3,891,282 | 6/1975 | Tuffias | 384/123 |
| 4,054,293 | 10/1977 | Hoeg et al. | 277/135 X |
| 4,254,961 | 3/1981 | Fersht et al. | 277/80 |
| 4,407,508 | 10/1983 | Raj et al. | 277/80 X |

Primary Examiner—Stuart S. Levy
Assistant Examiner—Lynn M. Sohacki
Attorney, Agent, or Firm—Richard P. Crowley

[57] ABSTRACT

A composite ferrofluid bearing and seal apparatus which comprises a ferrofluid seal apparatus which contains disposed therein a bearing element, to form a ferrofluid-film bearing with the surface of a shaft, the ferrofluid seal apparatus retaining the bearing ferrofluid film within the bearing cavity, by forming a ferrofluid O-ring seal, held by magnetic flux, at each end of the bearing element, the composite ferrofluid bearing and seal apparatus acting to contain the bearing ferrofluid film within the fluid-film bearing cavity and to exclude gases from being entrained in the ferrofluid.

5 Claims, 3 Drawing Figures

FERROFLUID BEARING AND SEAL APPARATUS

This is a continuation of co-pending application Ser. No. 545,875 filed on Oct. 27, 1983, now abandoned.

BACKGROUND OF THE INVENTION

Single-, dual- or multiple-stage ferrofluid seals are usefully employed for forming one or more ferrofluid O-rings about a shaft element, to provide for sealing about the shaft element. Ferrofluid seals are employed with shafts having moderate speed rotation and are useful for sealing in bearing lubricants, in order to prevent the bearing lubricants from reaching areas that must be free of contamination. While such ferrofluid seals can withstand typically a gas-pressure difference of about 3 to 5 psi per ferrofluid stage, such ferrofluid seals are generally incapable of withstanding liquid pressure; for example, a magnetic fluid pressure, and even low pressure, during dynamic operations; that is, when the shaft is being rotated. Such liquid-pressure situations may arise, for example, when a bearing lubricant reservoir is attached for replenishment of the bearing fluid, or when a reservoir is combined with circulation through a cooler, in order to maintain the desired bearing temperature during dynamic operation of the shaft.

Under dynamic operating conditions, the ferrofluid, which includes ferrolubricants which perform the functions of providing a fluid film, as well as a lubricating film for a ferrofluid bearing, tends to move longitudinally outwardly, due to the rise in temperature under the operating conditions, and expansion of the ferrofluid, by virtue of the heat generated by the shearing forces on the ferrofluid and the differential expansion of the component parts of the bearing.

Bifluid, hydrodynamic bearing systems have been described, for example, in U.S. Pat. No. 3,439,961 in which scavenger grooves are employed, to impel the bearing fluid toward the axial center of the bearing cavity, so as to reduce any leakage of the bearing fluid under load or dynamic conditions. This patent also provides a ferromagnetic fluid as a bearing lubricant, wherein the bearing lubricant is magnetized and retained in position not only through the magnetic field, but through the use of nonwetting TEFLON material at each end of the bearing cavity. In addition, U.S. Pat. No. 3,891,282 discloses an assembly, wherein use is made of spiralling channels which urge a lubricant into the bearing gap of a lubricating bearing assembly, where the shaft of the bearing assembly is sealed by a magnetic seal.

It is desirable to provide a composite ferrofluid-seal, fluid-film bearing, either radial, thrust or a combination of radial and thrust, apparatus of simple design and construction and which provides an effective means to retain the ferrolubricant employed in the bearing cavity, particularly under dynamic operating conditions.

SUMMARY OF THE INVENTION

The invention relates to a ferrofluid seal-bearing apparatus and method of retaining a ferrofluid within a fluid-film bearing assembly. In particular, the invention relates to a composite ferrofluid seal-bearing assembly, wherein a ferrolubricant is maintained within a fluid-film bearing radial or thrust cavity by a magnetic ferrofluid seal, which prevents the escape of the ferrolubricant under dynamic conditions.

The invention comprises a composite, compact, simple, ferrofluid seal-bearing assembly or apparatus, wherein the use of a magnetic field, to form a ferrofluid seal at either end of a bearing cavity or of a fluid-film bearing cavity or gap, is employed, to prevent the longitudinal movement or escape of the ferrofluid from the thin, fluid-film bearing cavity under dynamic operations, and which seal, at either end of the bearing cavity, pervents the entrainment of gases or air into the bearing ferrofluid. Under dynamic operating conditions, the thin film of the ferrofluid or ferrolubricant, since the ferrofluid acts both as a ferrofluid and also has lubricant properties, moves longitudinally outwardly along the shaft, due to the pressure generated in the thin ferrofluid bearing film; and due to the heat generated by the shearing force resulting from the relative motion of the bearing surface and the rotary shaft surface.

In the invention, the ferrofluid is retained within the fluid-film bearing cavity, by placing one or more ferrofluid magnetic seals at each end of the bearing cavity, to entrap the ferrofluid within the bearing cavity and to inhibit the longitudinal outward movement of the ferrofluid from the bearing cavity. One or more ferrofluid O-ring seals are provided at each end of the bearing cavity, the O-ring seals forming an exclusion or pressure seal and held in position by virtue of a concentrated magnetic-flux field about the shaft. The compact, integral, ferrofluid seal-bearing apparatus of the invention avoids the difficulties associated with prior-art practices, such as in U.S. Pat. No. 3,439,961, wherein the ferrofluid within the entire bearing cavity is subjected to a magnetic force. Generally, a ferrofluid within a concentrated magnet field tends to increase in viscosity and to change significantly its properties, which may affect the proper operation of the ferrofluid as a fluid-film bearing fluid, by an increase in shearing force and by an increase in the expansion of the ferrofluid employed. By employing one or more ferrofluid sealing O-rings at each end of the cavity, and in the absence of a magnetic field throughout the fluid-film bearing cavity, the ferrofluid is retained in position, without affecting the viscosity or properties of the ferrofluid.

Thus, the invention comprises in its simplest form employing a dual-stage ferrofluid O-ring seal and encompassing the bearing element within the two pole pieces, to provide for a bearing cavity directly adjacent and contiguous with the ferrofluid O-ring seals at each end of the bearing cavity.

The composite ferrofluid seal-bearing apparatus of the invention comprises a movable, magnetically permeable shaft element, typically a rotatable shaft element, to be placed within the radial or radial-thrust seal bearing assembly, and an annular permanent magnet which surrounds the shaft element and which has a one and another end of opposite polarity. The apparatus includes first and second pole pieces, one end of each pole piece being in a magnetic-flux relationship, typically adjacent, with the one and the other ends, respectively, of the annular permanent magnet. The other ends of each of the pole pieces extend into a close, noncontacting relationship with the surface of the shaft element, to form one or more radial gaps under the other end of each pole piece. In the simplest form, the radial gap will be a single- or a dual-stage ferrofluid-filled gap with one radial gap at each end of the bearing cavity, while, in other embodiments, particularly where a higher-pressure seal is desired, one or the other, or both, ends of the pole pieces may be grooved or have knife edges, or the shaft under the pole pieces grooved or having knife edges, to form a plurality of ferrofluid-filled radial gaps underneath each end of the pole pieces, with interstage air cavities between the respective gaps.

A ferrofluid is employed within the radial gaps, to form one or more ferrofluid O-ring seals extending about the surface of the magnetically permeable shaft element. A nonmagnetic bearing element, typically a cylindrical element, is disposed between the first and second pole pieces and extends into a close, noncontacting relationship with the surface of the shaft element, and typically in a closer relationship than the radial gap at the ends of the pole pieces, such as, for example, 0.1 to 1 mils, while the pole pieces typically range from about 2 to 8 mils in radial gap. The internal surface of the bearing element forms a generally thin, tubular fluid-film bearing cavity or gap about the surface of the magnetically permeable shaft element. A ferrofluid is placed within the bearing cavity, which ferrofluid may be the same or a different ferrofluid than that employed in the radial gaps under the respective pole pieces. However, the ferrofluid typically should extend continuously through the radial bearing cavity and into the radial gaps of the seal at each end of the bearing cavity, without any air or gas spaces therein, so that air or gas is not entrapped in the ferrofluid during rotary movement of the shaft. The composite ferrofluid seal-bearing assembly described is compact, simple in design, is low-cost and effective in preventing the longitudinal movement or expansion outwardly of the ferrofluid from the film-bearing cavity, and without affecting the film-bearing properties of the ferrofluid so employed in the bearing cavity.

The ferrofluid employed, for the purposes of this invention, may be any ferrofluid, but usually comprises a very low-volatility ferrofluid, which also has fluid-film bearing and/or lubricant-type properties. Generally, the type of ferrofluid employed is the same ferrofluid underneath the radial gaps and the fluid-film bearing cavity, and generally comprises a very low-volatility, synthetic hydrocarbon or ester carrier fluid with colloidal magnetic particles dispersed therein, and generally would comprise, for example, a synthetic hydrocarbon having a very narrow boiling-point distribution, to avoid the presence of high-volatility materials. The viscosity of the ferrofluid may vary, depending upon the fluid-film bearing properties desired, but typically ranges from about 50 cp to 500 cp at 25° C., and, for use as an O-ring seal, has a magnetic saturation generally ranging from about 100 to 500 gauss.

In a further embodiment of the ferrofluid seal-bearing apparatus of the invention, it has been found desirable to alter the geometry of the external outer edges of the other ends of each of the pole pieces, in order to provide a variable magnetic gradient extending toward the outer edges of each of the pole pieces, such as by chamfering, contouring or tapering the edges of the pole pieces, to provide a variable gradient. The altering of the outer edge provides additional space for the expansion longitudinally outwardly of the ferrofluid from the O-ring seal, without loss of the ferrofluid. The alteration of the outer edges of the pole pieces provides an axial variation of the magnetic gradient beneath the ends of each of the pole pieces, so that, as the ferrofluid expands axially, there is additional volume created under the pole pieces to retain the ferrofluid. Thus, the ferrofluid seal-bearing apparatus provides for very low or no magnetic flux within the bearing cavity, and a generally uniform flux under the interior portion of the pole pieces and, optionally, a variable declining magnetic flux under the outer-edge portions of the pole pieces.

In another embodiment of the ferrofluid seal-bearing apparatus of the invention, a reservoir of ferrofluid is positioned on one or typically on both sides of the bearing element and adjacent the pole-piece elements, so that the excess ferrofluid within the ferrofluid reservoir acts as a reserve ferrolubricant and mixes with the ferrofluid which is in the fluid-film bearing cavity, so as to aid in cooling the ferrolubricant and to limit the change in bearing clearance which might be caused by differential thermal distortion of the component parts of the apparatus. Thus, in one preferred embodiment, a ferrofluid reservoir space is created on either side of the bearing element, to contain excess ferrofluid. This ferrofluid reservoir is completely filled with ferrofluid, so as to exclude the entrainment of gases, such as air, in the ferrofluid within the bearing assembly. Generally, ferrofluid reservoir spaces comprise an annular disc-like space of defined height extending about the shaft and generally adjacent each end of the bearing element and between the bearing element and the ferrofluid O-ring seal created by the pole pieces.

Another embodiment of the invention comprises placing a thin layer or coating of a nonmagnetic bearing-type material at the end of the pole pieces. The thickness of the nonmagnetic bearing material is insufficient to effect substantially the magnetic flux through the ends of the pole pieces; that is, the pole pieces will still act to retain a ferrofluid O-ring in position; however, the bearing material; for example, 0.1 to 1 mil in thickness or more, extends within the same or slightly greater bearing thickness than the bearing element. This embodiment is particularly useful when there is a difference between the ends of the pole pieces and the bearing elements, the bearing elements being closest to the shaft. Where there is a possibility of the shaft or the bearing moving, so as to touch the pole pieces, it is desirable to provide a thin bearing material at the ends of the pole pieces and to extend the pole pieces at the same or slightly greater distance than the fluid-film gap in the fluid-film bearing cavity.

In another embodiment of the invention, the ferrofluid reservoir employed within the ferrofluid seal-bearing apparatus may be used alone or be supplemented by an external ferrofluid reservoir in which the ferrofluid is then fed from a feed groove into the bearing cavity and withdrawn from the bearing cavity during dynamic operation of the shaft, which arrangement is particularly adaptable to a large bearing apparatus, where such an external circulation of bearing lubricants is known and is employed to provide a fresh bearing film to either bearing cavity, and also to control the temperature of the ferrolubricant, by external cooling of the ferrolubricant withdrawn from the bearing cavity and supplying cool lubricant to the bearing cavity during operation. Thus, the use of an external heat-exchange-type ferrofluid reservoir, alone or in conjunction with the ferrofluid reservoir of the composite ferrofluid seal-bearing assembly, also may be employed to prevent excess expansion of the ferrofluid through heating up of the ferrofluid in conjunction with the ferrofluid O-rings at each end of the bearing cavity.

The ferrofluid seal-bearing apparatus of the invention also may include the employment of grooves, either on the bearing surface or on the adjacent surface of the shaft adjacent the bearing surface, or on both surfaces, in order to force inwardly the ferrofluid away from the ferrofluid O-ring seals at each end of the bearing assembly and inwardly toward the bearing cavity; thus, helping to retain the ferrofluid in the bearing cavity in a manner like a screw, to force gradually the fluid inwardly on rotation of the shaft. In such embodiment, there are generally at least two grooves which extend together at least 180° around the perimeter of the shaft, or there may be a plurality of grooves spaced apart, overlapped and canted. The grooves need not be connected and may extend peripherally generally at an angle to the axis of the shaft in the bearing apparatus, typically a few degrees for up to about 10° or more, in order to provide a pumping pressure inwardly. If the grooves are placed at 0° or 90°, then, of course, there would be no pumping action. Generally, the grooves should be shallow in depth and greater in width, typically, for example, from 100 to 1,000 microinch in depth or less than 1 mil, and from 2 to 10 mils in width. For example, the grooves may be placed in the surface of the bearing element, and there may be, for example, ten grooves each groove extending somewhat more than 36°, to form a peripheral circle about the shaft, the grooves spaced apart and canted 1° to 10°, so that ferrofluid is forced toward the center of the bearing cavity.

The grooves should be positioned adjacent each end of the bearing element and adjacent the ferrofluid O-ring seal. The employment of grooves to pump the ferrofluid in the bearing cavity may be used in conjunction with external fluid circulation, such as by pumping the ferrofluid, by providing for the step of a pressure-dam bearing configuration using an exit port or a hole in front of the dam. In addition, a multiple-dam or multiple-step design may be employed, if desired, as well as a herring-bone design to provide a pumping action. Typically, ferrofluid is fed to the bearing via a return passage connected to the circumferential grooves in the bearing. The bearing feed grooves are connected to the circumferential grooves, and the circumferential grooves serve to maintain the low-pressure ambient ferrofluid supply to the annular film under the ferrofluid seals at each end. The bearing designs may be of varying types, including cylindrical, multiple-groove, multiple-lobe, pressure-dam, multiple-step, multiple-shrouded-step, herring-bone, porous or the like. Thus, the ferrofluid film under the ferrofluid seal section also may contain spiral grooves over part of the axial sections to pump inwardly to the bearing section and assist in the sealing action of the ferrofluid seal. The circulation of the ferrofluid in the bearing cavity permits the isolation of the high-pressure region under the bearing, and avoids high pressure under the ferrofluid O-ring seal at each end of the bearing cavity; thus, preventing the excess expansion of ferrofluid from each end of the bearing. The ferrofluid seal-bearing apparatus of the invention permits the employment of any type and geometry of fluid-film bearing assembly within the confines of the ferrofluid O-ring seal apparatus. However, for the purpose of illustration only, a cylindrical, fluid-film bearing assembly will be illustrated.

For the purpose of illustration only, the ferrofluid seal-bearing apparatus of the invention will be described in connection with particular embodiments; however, it is recognized that various changes, additions, modifications and improvements to the illustrated embodiments may be made by those persons skilled in the art all falling within the spirit and scope of the invention.

DESCRIPTION OF THE EMBODIMENTS

Figure 1:
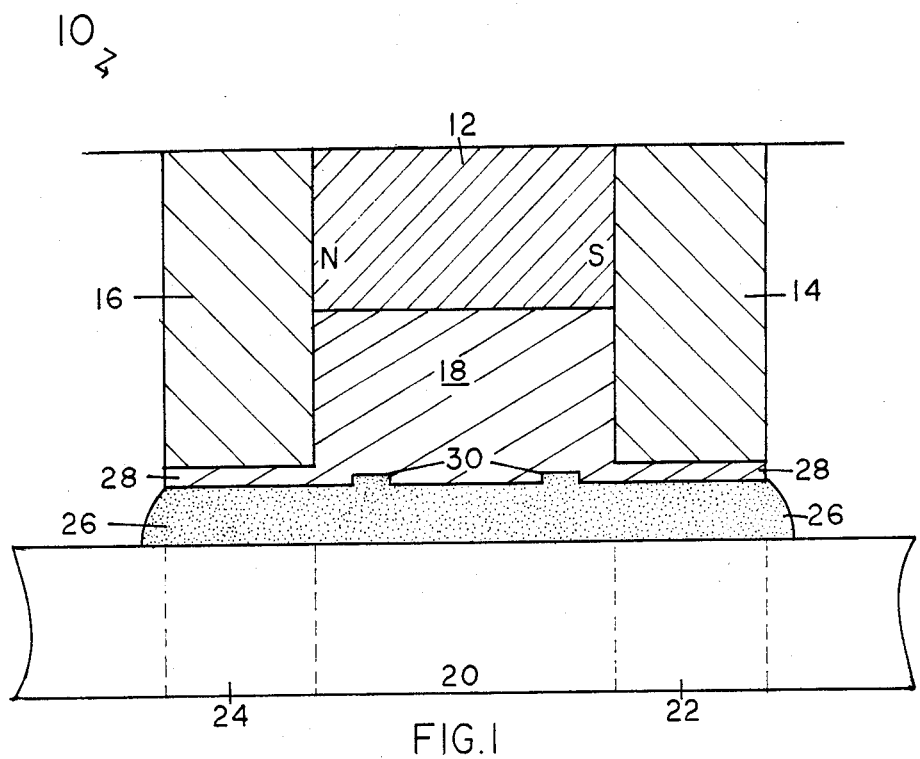
FIG. 1 is an illustrative sectional view of a portion of the ferrofluid seal radial bearing apparatus of the invention.

FIG. 1 illustrates a sectional view of the top half of a ferrofluid seal-bearing apparatus 10 of the invention, comprising an annular permanent magnet 12 and pole pieces 14 and 16, the pole pieces extending toward a shaft element 20, to form a radial gap at each end thereof of about 2 to 3 mils, and extending between each of the pole pieces. Occupying the space below the annular permanent magnet 12 is a nonmagnetic bearing-type material, such as bronze bearing material, in which the interior surface thereof extends into a close, fluid-film bearing relationship with the surface of the shaft 20, to form a fluid-film bearing cavity, and which surface contains peripheral shallow-type grooves 30 disposed a few degrees offset from the axis of the shaft 20. The fluid-film bearing cavity is typically about 0.1 to 0.8 mils from the surface of the shaft. The ends of the pole pieces contain a thin coating of a bearing material 28 positioned to make the ends of the pole pieces generally flush with the surface of the bearing element 18, so as to present a bearing surface which extends over the entire ferrofluid seal-bearing apparatus 10. A ferrofluid, which also acts as a ferrolubricant 26, is placed in the bearing cavity and underneath the radial gap of each pole piece to form a continuous flow of ferrofluid 26, and wherein, at each end of the apparatus 10, there is formed, as illustrated by the dotted lines across the surface of the shaft ferrofluid O-ring seals 22 and 24, with the ferrofluid underneath the radial gaps of the pole pieces 14 and 16 retained in position, by virtue of the magnetic flux. The magnetic-flux surface passes through the permanent magnet 12, the pole pieces 14 and 16, the ferrofluid 26 beneath each of the ends of the pole pieces 14 and 16 and the magnetically permeable shaft 20.

In operation, the magnetic flux from the pole pieces 14 and 16, which form the O-ring seals 22 and 24, retains the ferrofluid between the O-ring seals 22 and 24 as a fluid-film ferrolubricant or ferrofluid across the length of the bearing element 18. The shallow grooves 30 on the surface of the bearing element, which may or may not be connected via grooves as an inlet and outlet into the bearing apparatus to an externally cool ferrofluid reservoir, are offset slightly from the axis of the shaft 20 and are placed adjacent the pole pieces, so as to force the ferrofluid, on the inward side of the O-rings 22 and 24, inwardly toward the center of the bearing 18. In this embodiment, the ends of the pole pieces are capped with bronze, nonmagnetic bearing material which extends the ends of the pole pieces in line with the surface of the bearing element 18, to extend the bearing surface. In this arrangement, then any canting of the bearing apparatus of the shaft does not cause any scoring damage, while the thinness of the nonmagnetic material does not affect substantially the magnetic flux which retains in position the ferrofluid O-rings seals 22 and 24 and prevents the outward, longitudinal axial expansion of the ferrofluid under dynamic conditions, and, further, prevents the entrapment of air or gases in the ferrofluid underneath the bearing element 18.

Figure 2:
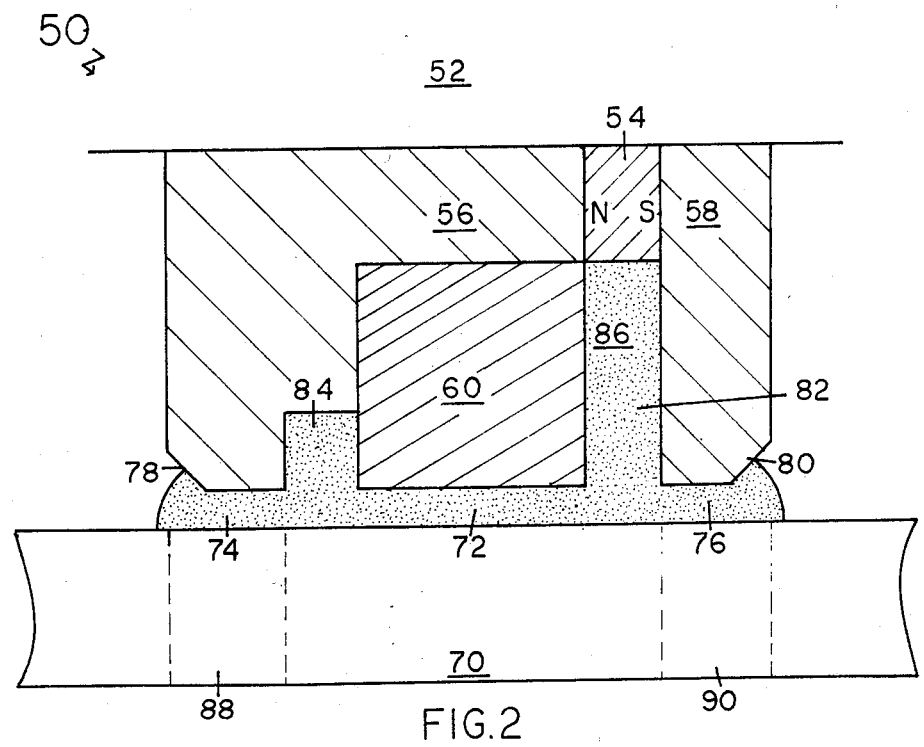
FIG. 2 is an illustrative sectional view of another embodiment of the ferrofluid seal radial bearing apparatus of the invention.

FIG. 2 is a half-sectional view of a ferrofluid seal-bearing apparatus 50 of the invention, wherein the apparatus includes a ferrolubricant reservoir. The apparatus 50 includes a nonmagnetic housing 52 containing an axially polarized, annular permanent magnet 54 surrounding a shaft 70, the magnetically permeable shaft 70 having opposed magnetically permeable pole pieces 58 and 56, the ends of the pole pieces 58 and 56 being generally parallel with the surface of the shaft and extending into a close noncontacting relationship with the surface of the shaft, to form a radial gap 74 and 76 therewith: for example, 2 mils. Positioned within the housing and between the pole pieces 56 and 58 is a generally cylindrical, nonmagnetic, for example, bronze, bearing element 60 having a surface which is spaced apart, to form a fluid-film bearing cavity 72 adjacent the surface of the shaft 70. On either side of the bearing 50, there is formed, by the pole pieces 56 and 58, ferrofluid reservoirs 82 and 84 in which excess ferrofluid 86 is employed, which ferrofluid acts to form a ferrofluid O-ring at the end of pole pieces 56 and 58, the O-rings illustrated by dotted lines 88 and 90 across the surface of the shaft 70. As illustrated, the bearing 60 extends into a closer relationship with the surface of the shaft 70 than do the ends of the pole pieces 56 and 58. Further, the exterior edges of the pole pieces 56 and 58 are chamfered, to provide surfaces 78 and 80, so as to provide additional volume under the ends of the pole pieces and a variable magnetic-flux gradient at the end of each of the pole pieces.

In operation, the magnetic flux passes through the permanent magnet 54, the pole pieces 56 and 58 and the ends of the pole pieces, both the flat ends 74 and 76 and the chamfered ends 78 and 80, to retain the ferrofluid 86 as O-ring seals 88 and 90 at each end of the apparatus 50. The ferrofluid 86 is shown in an expanded condition, but still retained within the external edges 78 and 80 of the pole pieces 56 and 58 by the variable magnetic flux. The chamfered edges 78 and 80 permit the expansion outwardly of the ferrofluid, without loss of ferrofluid as the ferrofluid expands, due to heating up of the ferrofluid by shearing forces and by the expansion of the components of the seal 50, due to differential thermal expansion of different materials.

In operation, by rotation of shaft 70, the ferrofluid 82 in the narrow fluid-film cavity 72 circulates and moves into cavities 84 and 86 at each end thereof, providing new ferrolubricant from the cavity into the bearing cavity 72; thus aiding in reducing the rise in temperature of the ferrofluid. The ferrofluid completely occupies the apparatus 50 and both cavities 84 and 82 in order not to provide the source for entrapment of the ferrofluid, which would alter the ferrofluid properties and would affect the bearing properties in the bearing cavity 72. As illustrated, the ferrofluid is retained through the employment of adjacent ferrofluid reservoirs 84 and 82 and by the chamfered edges 78 and 80 within the ferrofluid seal-bearing apparatus 50, with the excess ferrofluid in the reservoirs 84 and 82 acting as a reserve ferrolubricant, and which excess ferrofluid mixes with the ferrofluid in the high-pressure portion of the bearing within the film bearing cavity 72, which aids to cool the ferrofluid and limit the change in bearing clearance. Optionally, of course, the bearing 60 may contain grooves and inlets and outlets, in order to remove ferrofluid from the ferrofluid reservoir and to cool externally the ferrofluid and to recirculate the ferrofluid back into the reservoirs, and/or to contain scavenger grooves on the surface of the bearing in the bearing cavity, to force inwardly the ferrolubricant.

Figure 3:
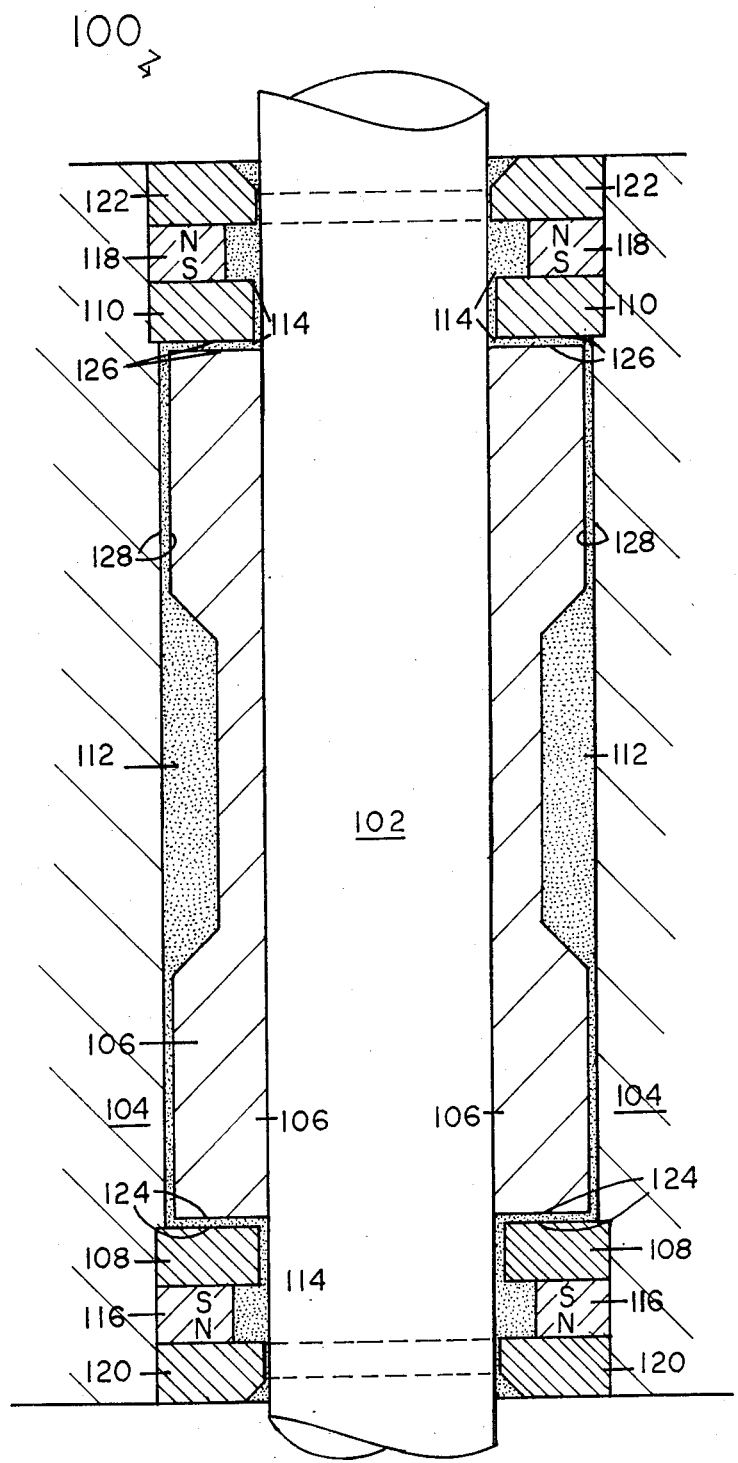
FIG. 3 is an illustrative sectional view of a ferrofluid seal radial-thrust bearing apparatus of the invention.

FIG. 3 illustrates a sectional view of a ferrofluid seal radial-thrust bearing assembly 100, which comprises a steel, magnetically permeable rotatable shaft 102 having secured thereto for rotation therewith a hardened steel collar 106 positioned within a bronze outer housing 104. The exterior radial surface of the collar 106 and the interior radial surface of the housing 104 are spaced apart, for example, 0.1 to 1 mil, and form opposing radial bearing surfaces 128. At each end of the radial-thrust bearing collar 106 are positioned lower and upper collars 108 and 110 which form thrust-bearings. The upper surface of the lower collar 108 and the lower surface of the upper collar 110 are spaced apart from the respective lower and upper ends of the collar 106 to form thrust-bearing surfaces 124 and 126. The radial bearing 106 is further characterized by a radial reservoir cavity 112 for the storage of a ferrolubricant 114.

At the lower and upper ends of the radial-thrust bearing assembly, as illustrated, are single-stage, single-pole-piece ferrofluid seals, such seals are described in U.S. patent application Ser. No. 450,339, filed Dec. 16, 1982 now U.S. Pat. No. 4,407,508, issued Oct. 4, 1983, hereby incorporated by reference. The ferrofluid seals each comprise an annular permanent magnet 116 and 118 and a magnetically permeable, for example, steel, pole piece 120 and 122. One end of each pole piece extends toward and into a close noncontacting relationship with the exterior surface of the rotatable shaft 102 to form upper and lower radial gaps or, for example, 1-3 mils. Ferrolubricant 114 in the gaps forms respectively upper and lower seals which contain the ferrofluid between such upper and lower seals. The exterior side of the upper and lower pole pieces 120 and 122 are chamfered at an oblique angle illustrated at 45 degrees as in FIG. 2 to permit some outward radial movement of the ferrolubricant 114 in operation and to form a radiant density magnetic flux field under the pole piece.

As illustrated, the ferrolubricant 114 extends between the thrust and radial bearing surfaces and into the radial cavity between the pole piece magnet and upper and lower collars 108 and 110 to form a continuous layer of ferrofluid 114 on both the radial and thrust-bearing surfaces. The bearing assembly 100 illustrated is short in length, and, therefore, the single-pole-piece seal may be used at its lower level, since the amount of hydrostatic pressure on the pole piece lower seal is not high, for example, 2-4 inches of water; however, if desired, a multiple-stage ferrofluid seal may be employed as a lower ferrofluid seal with or without pressurization in order to obtain the ferrofluid where the hydrostatic head becomes excessive. As illustrated, lower and upper collars 108 and 110 are spaced apart a greater distance from the exterior surface of the shaft 102 than the ends of the pole pieces 120 and 122 to permit the passage of ferrolubricant but does not form but may, a radial-thrust bearing surface. The single-stage ferrofluid seal which extends about the periphery of the shaft 102 is illustrated by the dotted lines extending from the radial gap and the ferrolubricant retained therein by the magnetic flux.

In operation, the ferrolubricant extends between the upper and lower ferrofluid seal while the ferrolubricant in the cavity 112 permits the ferrolubricant therein to mix with the ferrolubricant on the thrust and radial bearing film surfaces to aid in cooling the ferrolubricant while the chamfered edge at each end of pole pieces 120 and 122 aids in retaining the ferrolubricant within the ferrofluid seal bearing assembly. The apparatus of FIG. 3 illustrates a ferrofluid seal with a combined radial and thrust bearing apparatus.

What is claimed is:

1. A ferrofluid seal-radial-thrust bearing apparatus which comprises:
   (a) a rotatable magnetically permeable shaft element;
   (b) a housing which surrounds the shaft element and has an interior radial surface to form a radial bearing surface;
   (c) a collar element secured to the shaft and having an exterior radial surface which is spaced apart from the interior surface of the housing to form a radial bearing cavity, the collar element having one and the other end generally with surfaces perpendicular to the axis of the shaft;
   (d) first and second thrust bearing elements at the one and other end of the collar element and having lower and upper surfaces respectively, which surfaces form respectively with the end surfaces a lower and upper thrust bearing cavity surrounding the shaft element;
   (e) separate, spaced apart upper first and lower second ferrofluid seal apparatus each of which comprises an annular permanent magnet about the shaft element and at least one pole piece which forms at the one end a radial gap with the surface of the shaft element, the first and second ferrofluid seal apparatus adjacent respectively either end of the first and second thrust bearing elements so that the bearing cavities are not substantially exposed to a magnetic field; and
   (f) ferrofluid which fills the radial thrust bearing cavities to act as a ferrolubricant and extends continuously to each of the radial gaps of the upper and lower ferrofluid seal apparatus to form at least one lower and upper O-ring ferrofluid seal about the surface of the shaft element to prevent the escape of the ferrofluid on the longitudinal outward movement of the ferrofluid from the thrust and radial bearing cavities and entrainment of gases in the ferrofluid during rotation of the shaft.

2. The apparatus of claim 1 wherein the exterior radial surface of the collar element defines a radial ferrofluid reservoir cavity about the collar element.

3. The apparatus of claim 1 wherein the first and the second ferrofluid seal apparatus comprises a single stage single pole piece ferrofluid seal apparatus.

4. The apparatus of claim 1 wherein the external ends of each of the pole pieces are chamfered outwardly to provide a place for the outward expansion of the ferrofluid under such ends.

5. The apparatus of claim 3 wherein the one end of either or both of the pole pieces of the single stage ferrofluid seal apparatus are chamfered outwardly at an angle of about 45 degrees.

* * * * *